(12) United States Patent
Campbell et al.

(10) Patent No.: US 10,036,867 B2
(45) Date of Patent: Jul. 31, 2018

(54) ILLUMINATING CABLE FOR ENHANCED TRACEABILITY

(71) Applicant: International Business Machines Corporation, Armonk, NY (US)

(72) Inventors: Eric J. Campbell, Rochester, MN (US); Sarah K. Czaplewski, Rochester, MN (US); Lee N. Helgeson, Rochester, MN (US); Jonathan L. Kaus, Rochester, MN (US); Pamela L. Lembke, West Lafayette, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/253,766

(22) Filed: Aug. 31, 2016

(65) Prior Publication Data

US 2018/0059349 A1 Mar. 1, 2018

(51) Int. Cl.
*G02B 6/44* (2006.01)
*F21K 2/06* (2006.01)
*H01B 7/36* (2006.01)

(52) U.S. Cl.
CPC .............. *G02B 6/447* (2013.01); *F21K 2/06* (2013.01); *H01B 7/361* (2013.01)

(58) Field of Classification Search
USPC .................................................. 385/100, 110
See application file for complete search history.

(56) References Cited

U.S. PATENT DOCUMENTS

| | | | |
|---|---|---|---|
| 6,347,172 B1* | 2/2002 | Keller | G02B 6/0006 385/102 |
| 6,798,956 B2* | 9/2004 | Morrison | G02B 6/447 385/100 |
| 7,029,137 B2 | 4/2006 | Lionetti et al. | |
| 7,406,231 B1 | 7/2008 | Beck et al. | |
| 7,561,060 B2 | 7/2009 | Duffy, III et al. | |
| 8,958,671 B2* | 2/2015 | Cofre Luna | G02B 6/0003 385/100 |
| 9,196,875 B2 | 11/2015 | Sakaguchi | |
| 2002/0061399 A1 | 5/2002 | Chizmas et al. | |
| 2004/0146254 A1* | 7/2004 | Morrison | G02B 6/447 385/100 |

(Continued)

*Primary Examiner* — Eric Wong
(74) *Attorney, Agent, or Firm* — Marcia L. Doubet

(57) ABSTRACT

Enhanced traceability of cables is provided using illumination. An embodiment comprises introducing a chemiluminescent (alternatively, flourescent) solution into a chamber coupled to at least a portion of an insulating jacket that surrounds a transmission medium, the chamber being initially hollow and, in at least a portion thereof, comprised of a substance through which light is viewable, such that upon introduction of the solution, light emitted by the solution is viewable through at least a portion of the chamber. In another embodiment, a first and second compartment contain a first and second substance, respectively, and are physically separated by a separator material. The separator material, when triggered to open, forms an opening between the compartments that allows the substances to mix, the substances being chosen as providing a chemiluminescent reaction upon the mixing, such that light emitted by the chemiluminescent reaction is viewable.

10 Claims, 7 Drawing Sheets

(56) References Cited

U.S. PATENT DOCUMENTS

| | | |
|---|---|---|
| 2004/0160774 A1 | 8/2004 | Lionetti et al. |
| 2007/0173320 A1 | 7/2007 | Hussaini et al. |
| 2008/0115957 A1 | 5/2008 | Duffy et al. |
| 2013/0209045 A1* | 8/2013 | Dean, Jr. ............ G02B 6/02033 |
| | | 385/113 |
| 2014/0150709 A1 | 6/2014 | Jones et al. |
| 2014/0178023 A1* | 6/2014 | Oh .......................... C03B 37/15 |
| | | 385/125 |
| 2015/0373449 A1 | 12/2015 | Jackson |
| 2016/0071380 A1 | 3/2016 | Tarpara et al. |
| 2017/0087055 A1* | 3/2017 | Tseng ................... A61N 5/0619 |
| 2017/0090179 A1* | 3/2017 | Tseng ................ A61M 25/0043 |

* cited by examiner

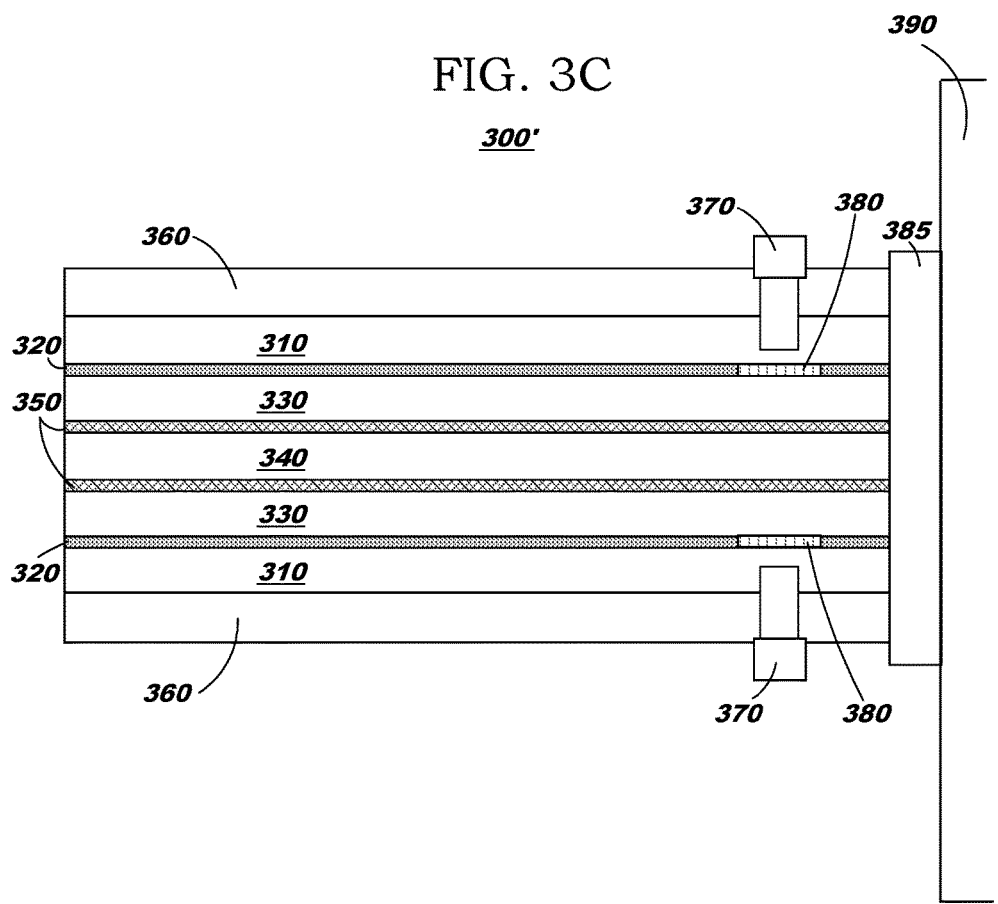

US 10,036,867 B2

ILLUMINATING CABLE FOR ENHANCED TRACEABILITY

BACKGROUND OF THE INVENTION

The present invention relates to physical cables, and deals more particularly with using a reaction among chemiluminescent or flourescent compounds for illuminating a selected cable. The illuminated cable thus becomes easier to identify, particularly if located within a group or bundle of cables.

When an electronic device is installed for use as, for example, a component of a computing system or network, there may be a number of cables connected thereto. It is common to have a relatively large number of electronic devices installed together in close proximity, each having its own connected cables. The cables may become intertwined, and/or may be placed in locations that are difficult to see and/or access. As the number of devices increases, the ability to locate a particular cable attached to a particular device becomes increasingly difficult.

BRIEF SUMMARY OF THE INVENTION

The present invention provides for enhanced traceability of a cable by illumination. In one embodiment, a cable apparatus preferably comprises: a transmission medium; an insulating jacket surrounding the transmission medium; and a chamber coupled to at least a portion of the insulating jacket, the chamber being initially hollow and, in at least a portion thereof, comprised of a substance through which light is viewable, such that upon introduction into the hollow chamber of a chemiluminescent (alternatively, flourescent) solution, light emitted by the chemiluminescent solution is viewable through at least a portion of the chamber. In another embodiment, a cable apparatus preferably comprises: a transmission medium; an insulating jacket surrounding the transmission medium; a first compartment coupled to at least a portion of the insulating jacket, the first compartment containing a first substance; and a second compartment coupled to at least a portion of the first compartment and physically separated therefrom by a separator material, the second compartment containing a second substance, wherein the separator material, when triggered to open, thereby forms an opening between the first compartment and the second compartment that allows the first substance to mix with the second substance, the first and second substances being chosen as providing a chemiluminescent reaction upon the mixing, such that light emitted by the chemiluminescent reaction is viewable from the cable apparatus. In an embodiment, tracing a cable using illumination preferably comprises introducing a chemiluminescent solution into a hollow chamber of a cable apparatus of which the cable forms a part, the chamber coupled to at least a portion of an insulating jacket that surrounds a transmission medium of the cable, a portion of the chamber comprised of a substance through which light is viewable, such that upon the introduction of the chemiluminescent solution, light emitted by the chemiluminescent solution is viewable through at least the portion of the chamber.

These and other aspects of the present invention may be provided in one or more embodiments. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIGS. 3C and 3D depict a view of a mechanism that may be used with this embodiment.

DETAILED DESCRIPTION OF THE INVENTION

Embodiments of the present invention are directed toward enhanced traceability of a cable by illumination. An embodiment provides for illuminating the cable along its length, or at least a portion thereof, without requiring power from the incorporating system (or elsewhere). The illumination comes from the mixing of substances that, when combined, emit light. A jacket or chamber surrounds the cable and contains the substances, and at least a portion of this jacket or chamber is translucent or transparent such that the emitted light can be seen.

As noted earlier, when an electronic device is installed as a component of a computing system or network, there may be a number of cables connected thereto, and it is common to have a relatively large number of electronic devices installed together in close proximity, each having its own connected cables. Commonly, the devices are installed into a rack or other housing. The housing space may be crowded with devices and cables, which makes locating a particular cable difficult. The housing may be located in a relatively dark area, and/or may be formed from dark material, which also makes it more difficult to see the cables and to locate a particular cable. As the number of cables increases beyond a small number, it becomes more likely that the cables will become intertwined, which increases the difficulty of locating a particular cable. This problem is exacerbated as the number of devices increases.

It is known to use cables of different colors in an attempt to improve the likelihood of locating a desired cable. However, as the number of cables increases, the colors may be reused, and it may be confusing to determine the correct instance of a particular cable color. In addition, if the cables are located in a low-light area, it may be difficult to distinguish among the colors. It is also known that light may be triggered by exposure to a separate light source, such as by providing a "glow in the dark" adaptation of a cable. This, however, requires a service technician to be able to get into close proximity of the particular cable, such that its reaction can be triggered. However, because of the proximity of other cables, it is highly unlikely that the lighting could be triggered for the appropriate cable while avoiding the triggering for other nearby cables.

Figure 1:
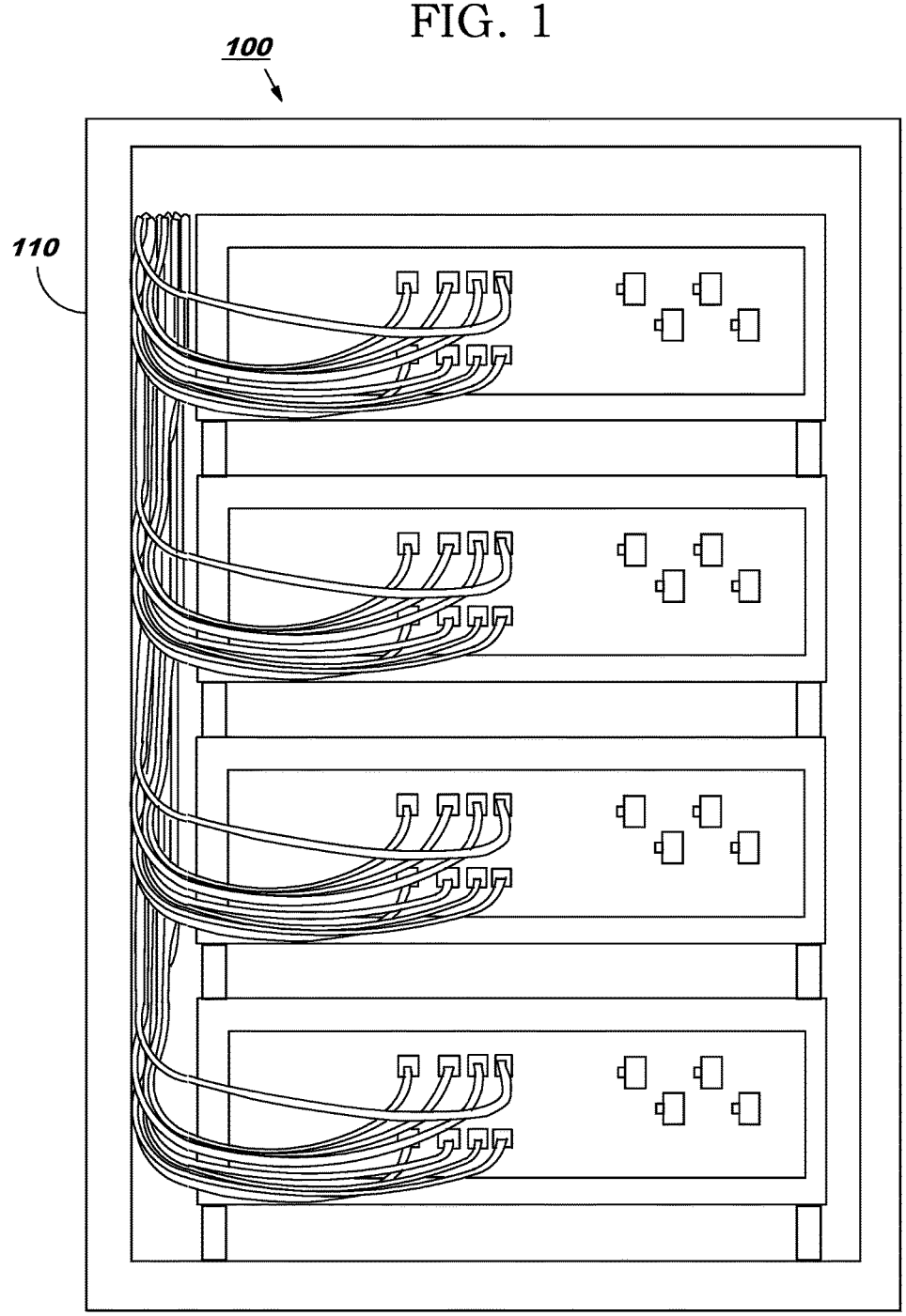
FIG. 1 illustrates an example of cabling bundles in the rear of a rack-mounted system of computing devices.

FIG. 1 illustrates an example of cabling bundles in the rear of a rack-mounted system of computing devices, shown generally at 100, where bundles of cables are shown extending outwardly from the leftmost portion of the rear of the devices (by way of example) in the racks. Large servers and racks of servers often have dozens of such cables running through them and out the back, as illustrated by the example. The cables are often similar to one another, and are bundled together and routed in tight, dark spaces. In FIG. 1, the side of the rack housing is shown at 110 as a solid enclosing surface, and it can be seen that the bundles of cables abut this side of the rack.

It can be seen from the example configuration in FIG. 1 that the difficult physical access conditions, as well as the sheer number of cables, makes it difficult for service personnel to identify, trace, and remove a particular cable that needs to be replaced. Service personnel using prior art approaches often need to cut a cable to remove it from among the other cables in a bundle, and even then, it can be difficult to trace the cut cable through the rack and pull it out due to the lack of light and the tight space.

An embodiment of the present invention uses cables that emit light through a translucent or transparent jacket or chamber (or portion thereof), thereby making it easier for service personnel to identify and trace a single cable among a bundle, even after the cable has been disconnected from the server or power source to which it had been attached and even though the cable may be located in a dark, cramped space. For ease of reference but not by way of limitation, the translucent or transparent jacket or chamber is referred to hereinafter as a translucent chamber or simply as a chamber. Notably, an embodiment does not require the entire cable length to be surrounded by such translucent chamber, and thus the translucence may comprise a portion or window-type area of the chamber.

Use of the present invention in an exemplary scenario will now be described. A server detects that an attached cable is defective, and generates a signal indicating that this cable needs to be replaced. (Techniques for this type of defect detection and corresponding signal generation are known in the art.) Typically, an LED (light-emitting diode) light on the server lights up, where this LED corresponds to the defective cable and indicates that the cable needs replacement. An end of the cable may also contain an LED that lights up, responsive to the generated signal. A service technician may thereby identify the beginning of the defective cable, based on either or both of these LEDs. As has been discussed, the technician will often find it difficult to trace the defective cable once he or she disconnects it from the server, due to the multitude of cables in the confined space. The technician therefore initiates the illumination reaction, according to an embodiment of the present invention, which causes the cable to glow. The glowing cable can thus be easily traced in order to locate it for removal.

Initiating the illumination reaction comprises causing a plurality of chemiluminescent compounds to mix together, forming a glowing liquid in the translucent chamber. (The compounds may alternatively be flourescent without deviating from the scope of the present invention. Accordingly, the compounds are referred to herein as chemiluminescent by way of illustration but not of limitation.) It is contemplated that the illumination reaction may cause light to be emitted for at least several hours, although a strict time period for such emission does not form part of the present invention. An example of suitable compounds to be mixed includes diphenyl oxalate with a flourescent dye and hydrogen peroxide, which produces light when the diphenyl oxalate is oxidized by the hydrogen peroxide, thus forming the unstable compound 1,2-dioxetanedione. This compound quickly decomposes to carbon dioxide and gives off energy, which is absorbed by the electrons in the dye, which in turn are promoted to their excited state and give off light when they lose their excess energy. The color of emitted light can be altered, depending on the dye used. Another example of mixing suitable compounds includes using luminol with an activating oxidizing agent, such as hydrogen peroxide, to produce light. Optionally, a catalyst such as sodium salicylate may be used to accelerate the chemiluminescent reaction.

The above-described examples of suitable compounds are provided by way of illustration but not of limitation. Other light-emitting species, precursors of emitting species, activators, and catalysts may be used without deviating from the scope of the present invention.

Various techniques may be used for initiating the illumination reaction, as will now be described with reference to scenarios illustrated in FIGS. 2A-2C and FIGS. 3A-3D.

Figure 2A:
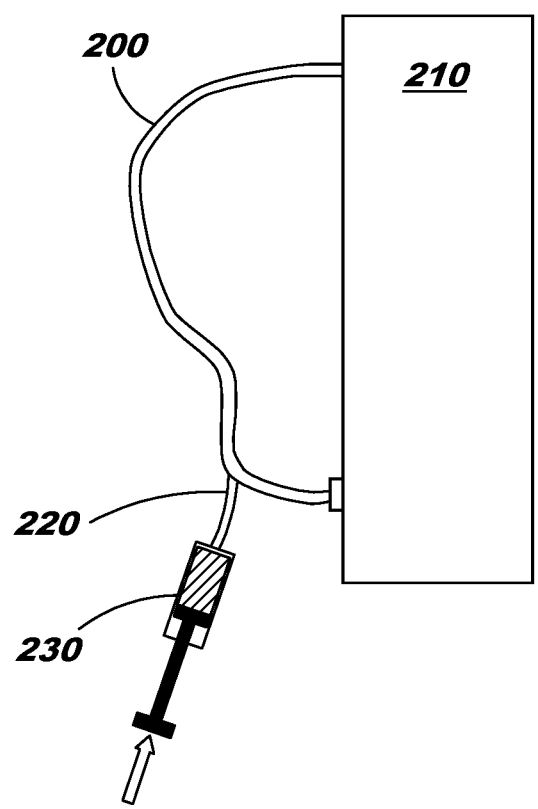
FIG. 2A illustrates a "before" scenario for an embodiment and FIG. 2B illustrates an "after" scenario for this embodiment, and FIG. 2C provides a closer view of components illustrated therein.
Figure 2A:
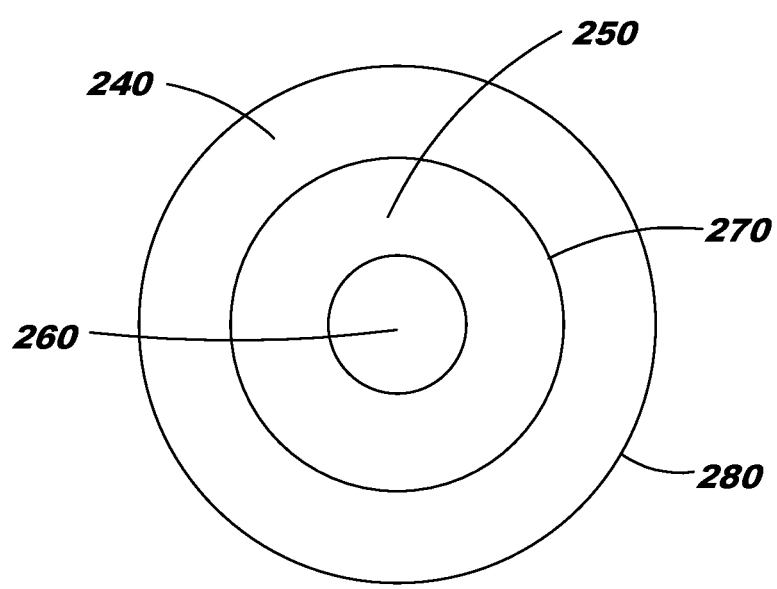
Figure 2B:
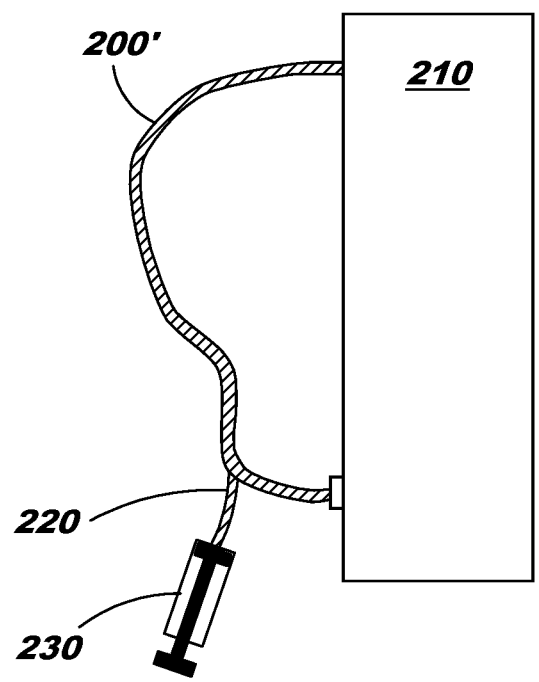
Figure 2B:
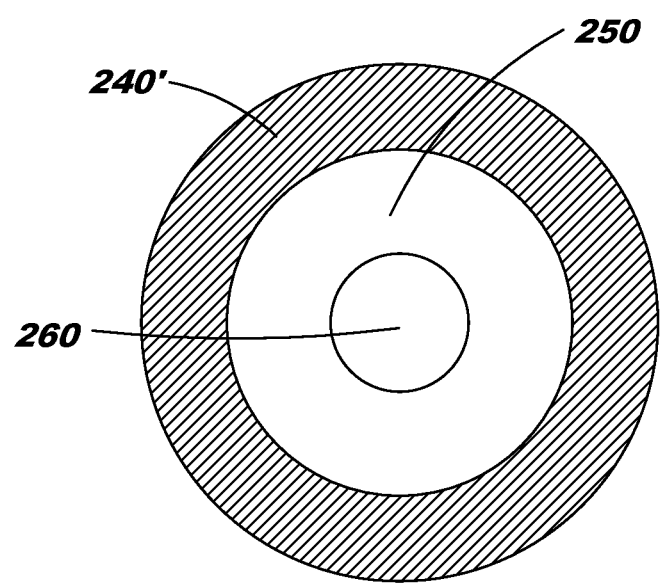

FIG. 2A illustrates a "before" scenario for an embodiment and FIG. 2B illustrates an "after" scenario for this embodiment. In this embodiment, the cable apparatus 200 (which is attached to a server 210, in the example) includes a translucent chamber. See the cross-sectional view in FIG. 2A, where the chamber is depicted at 240 as surrounding an insulating jacket 250 that in turn surrounds an inner transmission medium such as optical fiber or copper wire(s) 260. (It is known in the art for a cable to include an insulating jacket 250 that protects the inner transmission medium 260.) The chamber may be coupled to the circumference of the entire insulating jacket, or just a portion thereof (and either approach is deemed to be within the scope of the present invention). Preferably, the chamber is initially hollow. The service technician injects a solution created from chemiluminescent substances into the chamber. A syringe-type injector may be used for this purpose, as one example. See reference number 230, where this injecting is illustrated. (Preferred embodiments contemplate using a chemiluminescent solution created by the mixing of two substances, although this is by way of illustration, and a higher number of such substances may be used without deviating from the scope of the present invention.)

Figure 2C:
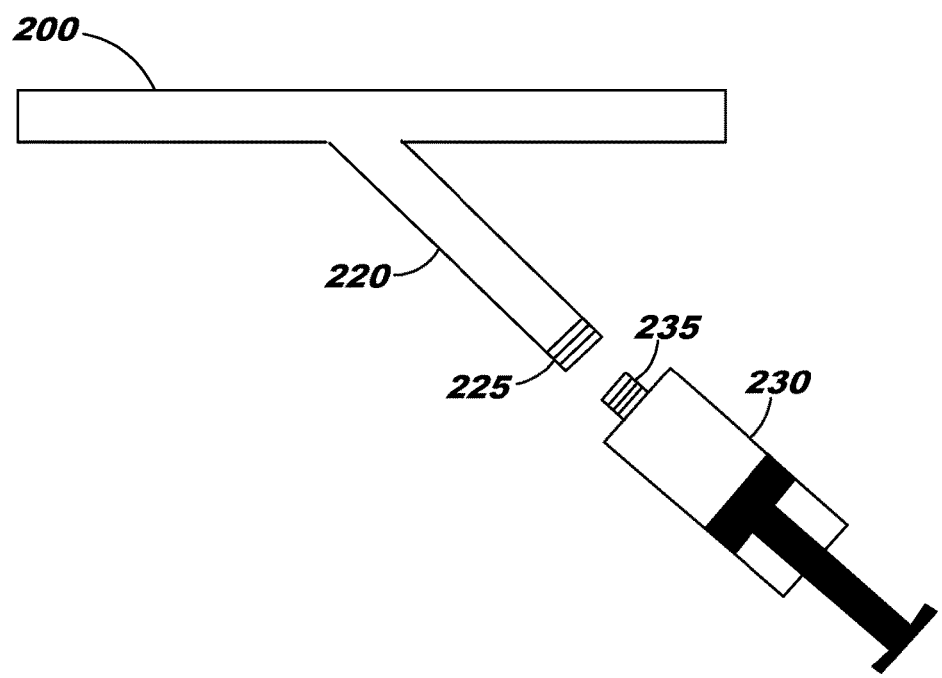

Preferably, the syringe injects the chemiluminescent solution into the chamber through a port that is provided into the chamber. See reference number 220. FIG. 2C provides a closer view of a port and syringe, showing how the port may be disposed on the cable, by way of example but not of limitation. In this example, port 220 appears as a tube branching outward from the cable 200, and an end of this port is configured with a female Luer lock 225. An end of the syringe 230 is then configured with a male Luer lock 235. (Luer locks are known in the art, and are commonly used in medical intravenous fluid injection and other applications.) When used as illustrated in FIG. 2C, the Luer locks enable the syringe to interlock with the port (which ideally prevents spillage of the chemiluminescent solution). The port may be located near an end of the cable 200; optionally, more than one port may be disposed along the length of the cable. For example, a port may be provided at each end of the cable so that a service technician can locate the cable from either end. It may also be desirable to have ports disposed at other places along the length of the cable, which may be particularly useful if the cable is relatively long (e.g., extending a long distance under the raised floor of a data center).

The chemiluminescent compounds are preferably mixed prior to introduction into the syringe, such that the injected solution is a liquid in which the light-generating chemical reaction is either beginning to occur or has already occurred. FIG. 2B shows a result of the injection, where cable 200' is now glowing because of the light emission through its translucent chamber. The cross-sectional view in FIG. 2B also depicts the chamber 240' as now glowing. (Hash marks are used in FIG. 2B to depict the glowing nature of cable 200' and chamber 240' for ease of drafting convenience.) This glowing will allow the service technician to identify the particular cable 200' from among a bundle or cluster of cables, even though the cable may be located in a low-light area, thus facilitating its removal by the technician. Note also that the service technician does not need to be in contact with, or in close proximity to, the cable 200' in order to see it when illuminated as disclosed herein.

The translucence of the chamber may be provided along its entirety; as one alternative, translucence may be provided through at least one portion or window-type area of the chamber. It should be noted that if a windowed approach is used, it is preferable that a plurality of windows are disposed along the length of the chamber, thereby increasing the likelihood that at least one glowing window will be in a position to be readily seen by the service technician. Note that while FIG. 2B depicts the glowing chamber 240' as comprising the entire circumference, this is by way of illustration and not of limitation. As an alternative, the liquid-filled chamber might be disposed as a channel extending along at least a portion of an outer surface 270 of insulating jacket 250, where the chemiluminescent solution is then injected into this channel, causing it to illuminate.

Optionally, the chemiluminescent liquid may subsequently be drained from the chamber 240, enabling the cable to be reused once the chemiluminescence has worn off.

As an alternative to using a port 220, the chemiluminescent solution may be introduced into the chamber 240 after puncturing an outer surface 280 of the chamber, provided that the outer surface (at least in the area of the puncturing) is made from a self-sealing substance.

Figure 3A:
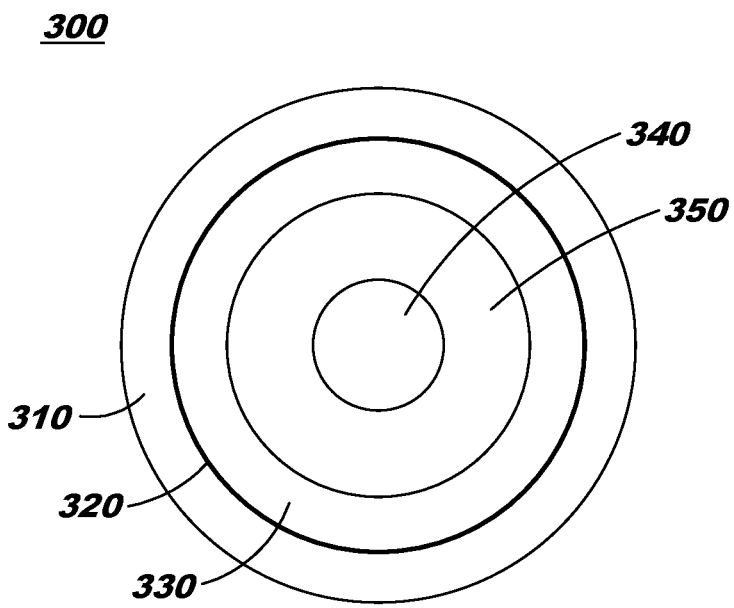
FIG. 3A illustrates a "before" scenario for another embodiment and FIG. 3B illustrates an "after" scenario for this embodiment.
Figure 3B:
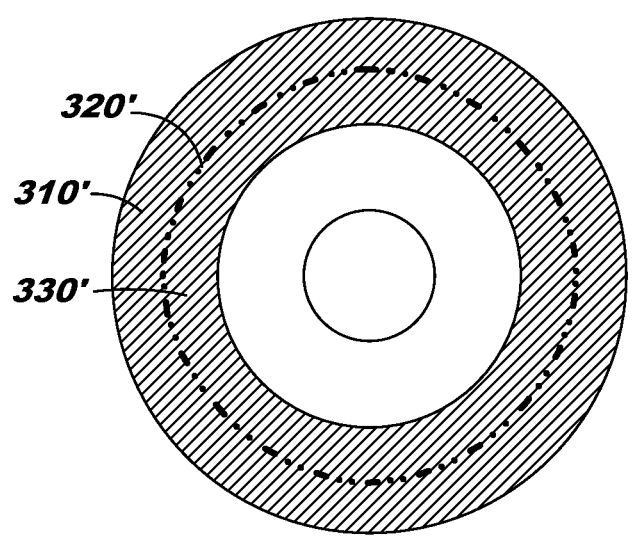

FIG. 3A illustrates a "before" scenario for an embodiment and FIG. 3B illustrates an "after" scenario for this embodiment. In this embodiment, the chemiluminescent reaction results from mixing contents of two concentric compartments within the overall cable apparatus 300, which is illustrated in the cross-sectional view of FIG. 3A. An inner transmission medium such as optical fiber or copper wire(s) 340 is surrounded by an insulating jacket 350 that protects the inner transmission medium 340. An outer compartment 310 and a next-outer compartment 330 are separated from one another by a membrane or material 320, where the outer compartment 310 is coupled to at least a portion of the insulating jacket 350. One of compartments 310, 330 contains the light-emitting specie or precursor of an emitting specie (such as diphenyl oxalate and fluorophore) and the other compartment contains an activator (such as hydrogen peroxide). The separator material 320 (referred to equivalently herein as the separator) is adapted for breaking, dissolving, deteriorating, opening, or otherwise allowing contents of the compartments 310, 330 to come into contact. A trigger of various types may be used to initiate this contact, such as applying heat, mechanical force, or the like, examples of which will now be described.

As one approach to the triggering, the separator 320, or at least a portion thereof, may be made of a substance that is brittle and cracks upon bending beyond a certain radius. Therefore, when bent at at least one region along the length of apparatus 300, the contents of the compartments 310, 330 would be allowed to mix. The cross-sectional view in FIG. 3B illustrates an effect of this scenario, where the separator 320' is now shown as being at least partially broken or otherwise compromised (as illustrated in FIG. 3B by broken lines, for drafting convenience). Contents of compartments 310, 330 can therefore come into contact and combine, causing a chemiluminescent reaction that produces light within the chamber formed as shown at 310', 330'.

As an alternative approach, at least one resistive heating element may be incorporated into a separator 320, in which at least a portion of the separator 320 is made from a relatively low melting point material such as polycaprolactone or an ethylene vinyl acetate polymer. (Polycaprolactone is a biodegradable polymer with a melting point around 60 degrees Celsius. Ethylene vinyl acetate polymers generally melt between 50 and 100 degrees Celsius, depending on their composition.) In this approach, before the cable is unplugged from the server (or other connected power source), the server supplies electrical current to resistive element(s) incorporated into the separator 320, thereby heating and melting at least a portion of the separator. This enables contents of compartments 310, 330 to come into contact and combine, causing a chemiluminescent reaction that produces light within the chamber formed as shown at 310', 330'.

As yet another alternative, instead of supplying the electrical current from the server prior to unplugging the cable in the scenario illustrated in FIGS. 3A and 3B, the electrical current could be applied externally for a relatively short period of time after the cable has been unplugged, thereby causing at least a portion of separator 320 to melt.

In still another alternative, the separator 320 may be composed of an electroactive polymer, or at least one region of electroactive polymer, that opens when exposed to current. In this approach, once the cable is unplugged, a battery may be connected to the separator to provide a source of current and thus allow the contents of compartments 310, 330 to come into contact and mix, causing a chemiluminescent reaction that produces light within the chamber formed as shown at 310', 330'.

Figure 3D:
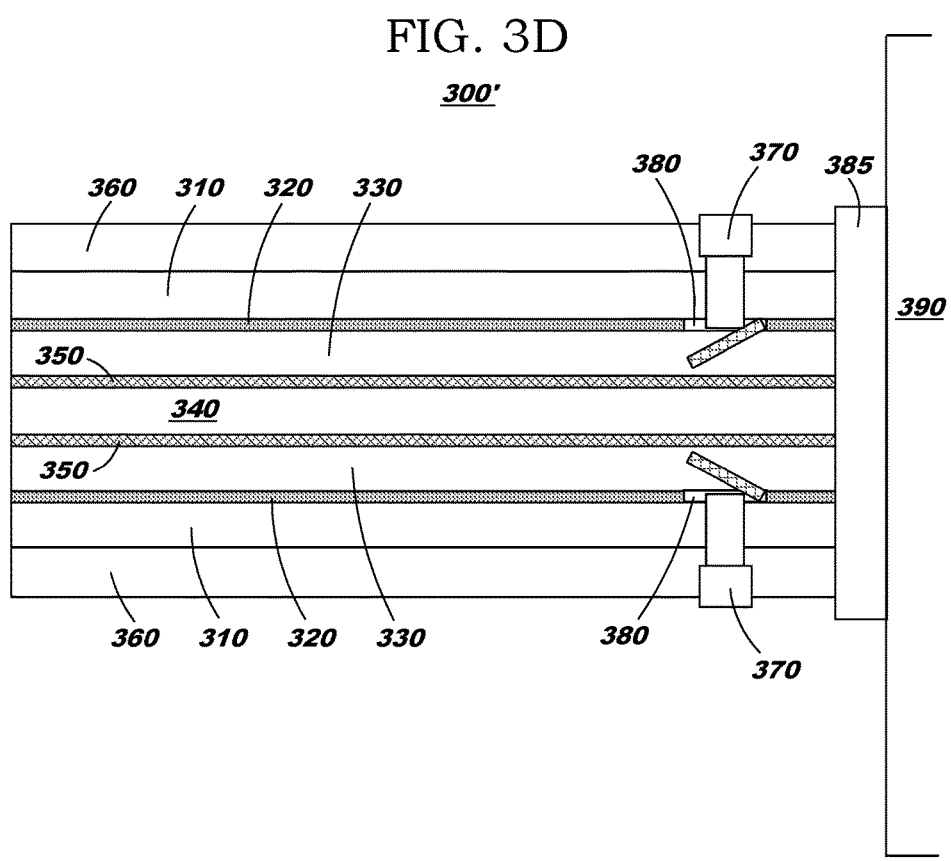

In yet a further alternative, cable apparatus 300 may be constructed such that separator 320, or at least a portion thereof, is capable of being removed once the cable is unplugged. This allows the contents of compartments 310, 330 to come into contact and mix, causing a chemiluminescent reaction that produces light within the chamber formed as shown at 310', 330'. Or, rather than completely removing the separator, a similar result may be achieved using an alternative where at least some portion of the separator is moved, thus providing an opening between compartments 310, 330 and allowing their contents to mix. This moving may be triggered, for example, by the service technician sliding a gating component out of an end of the cable apparatus, pressing a button embodied on the cable apparatus, and so forth. FIGS. 3C and 3D illustrate one approach that may be used with a button, as will now be described.

When a button is used to trigger the mixing of compartments 310, 330, the button may be located near an end of the cable or both ends of the cable. Optionally, a plurality of buttons may be placed around the circumference of the cable—for example, to facilitate faster mixing. This is shown in FIG. 3C, where buttons 370 are depicted. In this example, the cable 300' is shown with an added layer 360 in which buttons 370 are disposed. This added layer 360 is preferably clear, or translucent, in at least a portion of the length of the cable. Use of this additional layer may serve as a safeguard that prevents the chemiluminescent solution—as well as the contents of outer compartment 310, prior to the mixing—from leaking out. A valve 380 corresponding to each button 370 may be provided in the separator 320, as shown. FIG. 3D illustrates an effect of pressing the buttons 370. As shown therein, pressing buttons 370 causes the valves 380 to open, thereby allowing the contents of compartments 310, 330 to mix. As one option to providing valve(s) 380 in separator 320, the separator may be composed of a substance that will be punctured when a button 370 is depressed, thereby introducing a hole into the separator. In this case, the button may be configured to have a sharp tip or multiple sharp protrusions (not shown), causing the separator to rupture when the button is depressed. Note that while FIGS. 3C and 3D depict buttons 370 as being located near an end of the cable that attaches 385 to a server or system 390, this is by way of illustration and not of limitation; optionally, at least one additional location along the length of the cable may be configured with at least one button. This may be particularly useful if the cable is relatively long.

As can be seen from the above discussions, an embodiment of the present invention enhances traceability of cables using illumination. While discussions herein are primarily in terms of enhancing traceability of cables connected to servers or electronic devices, this is by way of illustration and not of limitation. An embodiment of the present invention may be used with signal cables (such as fiber optic or copper cables), power cables, or networking cables, as well as with hoses, cords, or wires for other industries or applications.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for tracing a cable using illumination, comprising:
   introducing a chemiluminescent solution into a hollow chamber of a cable apparatus of which the cable forms a part, the chamber coupled to at least a portion of an outer surface of an insulating jacket that surrounds an outer surface of a transmission medium of the cable, a portion of the chamber comprised of a substance through which light is viewable, such that upon the introduction of the chemiluminescent solution, light emitted by the chemiluminescent solution is viewable through at least the portion of the chamber.

2. A cable apparatus, comprising:
   a transmission medium;
   an insulating jacket surrounding an outer surface of the transmission medium;
   a first compartment coupled to at least a portion of an outer surface of the insulating jacket, the first compartment containing a first substance; and
   a second compartment coupled to at least a portion of the first compartment and physically separated therefrom by a separator material, the second compartment containing a second substance,
   wherein the separator material, when triggered to open, thereby forms an opening between the first compartment and the second compartment that allows the first substance to mix with the second substance, the first and second substances being chosen as providing a chemiluminescent reaction upon the mixing, such that light emitted by the chemiluminescent reaction is viewable from the cable apparatus.

3. The cable apparatus according to claim 2, wherein at least a portion of the second compartment is comprised of a substance through which the emitted light is viewable.

4. The cable apparatus according to claim 3, wherein the substance of which the at least a portion of the second compartment is comprised is translucent.

5. The cable apparatus according to claim 3, wherein the substance of which the at least a portion of the second compartment is comprised is transparent.

6. The cable apparatus according to claim 2, wherein one of the first substance and the second substance comprises a light-emitting specie or precursor thereof, and the other of the first substance and the second substance comprises an activator.

7. The cable apparatus according to claim 6, wherein:
   the light-emitting specie or precursor thereof comprises diphenyl oxalate and fluorophore; and
   the activator comprises hydrogen peroxide.

8. The cable apparatus according to claim 2, wherein:
   the separator material is brittle; and
   the triggering comprises breaking the separator material.

9. The cable apparatus according to claim 2, wherein:
   the separator material has at least one resistive heating element incorporated therein; and
   the triggering comprises heating at least a portion of the separator material to cause melting thereof.

10. The cable apparatus according to claim 2, wherein:
    a least a portion of the separator material is movable; and
    the triggering comprises moving the movable portion to form the opening.

* * * * *